United States Patent [19]

Kim et al.

[11] Patent Number: 5,704,713
[45] Date of Patent: Jan. 6, 1998

[54] RECONSTRUCTION OF GEOLOGIC THERMAL HISTORIES

[75] Inventors: Chul-Sung Kim; William S. Clendenen; Christopher S. Tapscott; William R. James; William G. Powell, all of Houston, Tex.

[73] Assignee: Exxon Production Research Company, Houston, Tex.

[21] Appl. No.: 694,060

[22] Filed: Aug. 8, 1996

Related U.S. Application Data

[60] Provisional application No. 60/002,036 Aug. 8, 1995.

[51] Int. Cl.$^6$ .......................... G01K 3/04; G01K 11/00; G01K 13/00
[52] U.S. Cl. .......................... 374/136; 374/102; 374/159; 364/557; 364/578
[58] Field of Search .......................... 374/102, 136, 374/159; 364/557, 578

[56] References Cited

U.S. PATENT DOCUMENTS

| | | | |
|---|---|---|---|
| 3,839,898 | 10/1974 | Talboom, Jr. et al. | 374/102 |
| 4,167,109 | 9/1979 | Gold | 374/102 |
| 5,188,457 | 2/1993 | O'Hara | 374/159 |
| 5,288,695 | 2/1994 | Pevear | 436/27 |

FOREIGN PATENT DOCUMENTS

| | | | |
|---|---|---|---|
| 1580184 | 7/1990 | U.S.S.R. | 374/136 |

OTHER PUBLICATIONS

Gallagher, K. Hawkesworth, C. J., and Mantovani, M. S. M., "The denudation history of the onshore continental margin of SE Brazil inferred from apatite fission tract data", Journal of Geophysical Research, vol. 99, No. B9, pp. 18,117–18, 145, Sep. 10, 1994.

Gallagher, Kerry, "Evolving temperature histories from apatite fission–track data", Earth and Planetary Science Letter 136 (1995) 421–435.

Lerche, Ian, "Thermal Indicator Tomography", Basin Analysis, Quantitative Methods, vol. 1, 1, 402–437 (1990).

Burnham, Alan K. and Sweeney, Jerry J., "A chemical kinetic model of vitrinite maturation and reflectance", Geochem. et Cosmochin., 53, 2649–2657, 1989.

Sweeney, Jerry J. and Burnham, A. K., "Evaluation of a Simple Model of Vitrinite Reflectance Based on Chemical Kinetics", AAPG Bull., 74, 11559–1570, 1990.

Crowley, Kevin D., "Lenmodel: A Forward Model for Calculating Length and Fission–Track Ages in Apatite", Computers and Geoscience, 19, 619–626, 1993.

Duddy, I. R., Green, P. F., and Laslett, G. M., "Thermal Annealing of Fission Tracks in 3. Variable Temperature Behaviour", Chem. Geol., 73, 25–38, 1988.

Green, P. F., Duddy, I. R., Gleadow, A. J. W., Tingate, P. R. and Laslett, G. M., "Thermal Annealing of Fission Tracks in Apatite 1. A Qualitative Description", Chem. Geol., 59, 237–253, 1986.

GreEn, P. F., Duddy, I. R., Laslett, G. M., Hegarty, K. A., Gleadow, A. J. W., and Lovering, J. F., "Thermal annealing of fission tracks in apatite 4. Quantitative modelling techniques and extension to geological timescales", Chem. Geol., 79, 155–182, 1989.

Laslett, G. M., Green, P. F., Duddy, I. R., and Gleadow, A. J. W., "Thermal Annealing of Fission Tracks in Apatite 2. A Quantitative Analysis", Chem. Geol., 65, 1–13, 1987.

(List continued on next page.)

Primary Examiner—Diego F. F. Gutierrez
Attorney, Agent, or Firm—Frank E. Reid; Stephen P. Koch

[57] ABSTRACT

The invention relates to a multivariate method of inverting paleothermometer and age indicator data to derive the temperature history of rocks. The method uses kinetic models of geologic material transformations and a simple but flexible representation of bed temperature history to invert the paleothermometer data. The method inverts the data by employing a genetic algorithm computation and kinetic model S. The result is a family of temperature histories which more accurately and more completely characterize temperature histories consistent with the rock samples than is possible by prior art methods.

11 Claims, 5 Drawing Sheets

OTHER PUBLICATIONS

Goldberg, David E., Genetic Algorithms in Search, Optimization, and Machine Learning, "Computer Implementation of a Genetic Algorithm", Chp. 3, 59–88, Addison–Wesley, 1989.

Huang, Wuu–Liang, Longo, John M, and Pevear, David R., "An Experimentally Derived Kinetic Model for Smectite–to–Illite Conversion and its Use as a Geothermometer", Clays and Clay Minerals, vol. 41, No. 2, 162–177, 1993.

Pevear, D. R., "Illite age analysis a new tool for basin thermal history analysis", I n Kharaka, Y. K. and Maest, A. S., Water–Rock Interaction WIR–8, Proceedings of the 7th International Symposium on Water–Rock Interaction, A. A. Balkema, Rotterdam, 1251–1254, 1992.

Corrigan, J., "Inversion of Apatite fission Track Data for Thermal History Information", Journal of Geophysical Research, vol. 96, No. B6, 10,347–10,360, Jun. 10, 1991.

He, Z. and Lerche, I., "Inversion of Multiple Thermal Indicators: Quantitative Methods of Determining Paleoheat Flux and Geological Parameters IV. Case Histories Using Thermal Indicator Tomography", Mathematical Geology, vol. 21, No. 5, 525–541, 1989.

He, Z. Multiple Thermal Indicator Tomography—Paleoheat Flux and Geological Parameters, Ph.D. dissertation, University of South Carolina, 1989.

| $T_1$ | $t_2$ | $T_2$ | $t_3$ | $T_3$ | ... | $t_{N-1}$ | $T_{N-1}$ | $T_N$ |

2(N-1) time-temperature parameters

| 01101100 |

RECONSTRUCTION OF GEOLOGIC THERMAL HISTORIES

CROSS-REFERENCE TO RELATED APPLICATIONS

This Application claims priority to and fully incorporates herein by reference U.S. Provisional Application Ser. No. 60/002,036, filed Aug. 8, 1995.

FIELD OF THE INVENTION

This invention relates to the field of reconstructing or modeling the thermal histories of rocks, especially of rocks from sedimentary basins. Specifically, but without limitation, this invention relates to a means of inverting paleothermometers to obtain a range of thermal histories consistent with observations.

BACKGROUND OF THE INVENTION

Reconstructed thermal histories of rocks are valuable for estimating the distribution and timing of hydrocarbon generation within a sedimentary basin. To warrant confidence, such reconstructed histories must be calibrated to local paleothermometric observations. In other words, at sites at which organic or inorganic paleothermometer measurements are available, those measurements should be in close agreement with corresponding values computed from the proposed thermal history.

Generally, the calibration of thermal reconstructions is accomplished with a trial-and-error forward-modeling approach. A geologic history (for example, a burial history or a heat flow history) is proposed, and temperature histories of the rock layers are computed. Expected values of the paleothermometers are calculated from the computed temperature histories, and these are compared to the observed values. Based on the comparison, a judgment is made as to how to adjust the geologic history so as to achieve a better agreement between calculated and observed values, and the process is repeated until the agreement is deemed satisfactory. Where the history is complex, however, or where the range of possible solutions is large, this approach is impractical. Therefore, the calculation is usefully implemented in an automated means of "inverting" the paleothermometers to obtain the range of thermal histories consistent with the observations.

Most schemes for inverting paleothermometric data are limited to a single type of paleothermometer (usually apatite fission tracks) observed at a single point (for example, a specific depth at a specific well-site). One such scheme was proposed by J. Corrigan, in "Inversion of apatite fission track data for thermal history information," *Jour. Geophys. Res.* 96, 10,347–10,360, 1991. However, the Corrigan approach suffers a number of limitations. First, different types of paleothermometers respond to different aspects of the thermal history. Therefore, focusing on a single type, where others are available, ignores potentially important constraints on the thermal history. In addition, at a given well-site, different stratigraphic levels have experienced related but different thermal histories. Focusing on data at a single level, where data are available at other levels, also ignores potentially important constraints on the thermal history.

Another approach has been published that addresses both concerns noted above and uses various types of paleothermometers at various depths in the stratigraphic section. See, for example, Z. He, and L Lerche, "Inversion of multiple thermal indicators: Quantitative methods of determining paleoheat flux and geological parameters. IV. Case histories using thermal indicator tomography," *Math. Geol.*, 21, 523–542, 1989. This approach also has limitations. First, the space of thermal histories addressed is limited to simply-parameterized variations of a simplistic geologic model. Second, the technique does not recognize the error-bounds associated with individual paleothermometer observations. In practice, some observations are much better determined than others. Third, the technique involves contouring of, or slope-following on, a surface of "mean square residual", which is a measure of the goodness of fit as a function of one or more parameters of the model. In many cases, this surface is expected to be complex, with many local minima and narrow troughs, and is not well treated by most numerical searching or slope-following techniques.

Therefore, there is a need for an improved method of interpreting complicated combinations of paleothermal indicators hosted by rocks with complicated thermal histories. Preferably, this improved method should find temperature histories which can serve as a guide for thermal reconstruction forward modeling, and which can determine which parts of the temperature history are well-constrained by the paleothermometer data and which parts are poorly-constrained. The method should allow thorough and efficient searching through the solution space of possible thermal histories to determine the range of histories consistent with the observations. The method should also give a qualitative indication about which paleothermometer data are providing the strongest constraint on the temperature history. The present invention satisfies this need.

SUMMARY OF THE INVENTION

The present invention is a multivariate method of inverting paleothermometer and age indicator data to derive the temperature history of rocks. Paleothermometer(s) as used herein includes geothermometer(s) and/or geochronometer (s). The method uses kinetic models of geologic material transformations and a simple but flexible representation of bed temperature history to invert the paleothermometer data. The kinetic models, which will be well known to those skilled in the art, describe the temperature and time dependence of chemical and physical transformations in geological materials. The method inverts the kinetic model data by employing a genetic algorithm computation. The genetic algorithm efficiently and thoroughly searches through the solution space of possible temperature histories which are consistent with the paleothermometer and age data. The result is a robust family of temperature histories which more accurately and more completely characterize temperature histories consistent with the rock samples than is possible by prior art methods.

A wide variety of paleothermometers and age indicators can be employed by the present multivariate method. The paleothermometer indicators which can be employed, without limitation, include:

- organic rock maturity (vitrinite reflectance, Thermal Alteration Index (TAI), Pyrolysis $T_{max}$, or other organic indicators) converted to equivalent Level of Organic Metamorphism (LOM)
- mean length of apatite fission tracks
- length distribution of apatite fission tracks
- transformation of smectitic clay to illitic clay
- maximum homogenization temperatures of predominantly-aqueous fluid inclusions The age indicators that can be employed without limitation include:

potassium-argon age analysis of illites apparent fission track age of apatites

Direct temperature constraints from downhole temperature measurements and paleoclimatic models can also be employed.

The present method can be employed with any combination of some or all of the above data that are available. However, in a preferred embodiment apatite fission track data are employed in conjunction with illite age data.

Data for the present method may derive from the subsurface, or even from surface samples in an eroded terrain. Data may sample the thermal history of a single rock unit, or data from multiple rock units, for example, at multiple stratigraphic levels, and/or depths may be simultaneously inverted.

The method finds temperature histories that are consistent with the available data. The range of acceptable temperature histories that is determined provides a quantitative indication of the uncertainty in the thermal history, or the incompleteness of the data constraints.

BRIEF DESCRIPTION OF THE DRAWINGS

All values shown on figures must be taken as examples not implying restriction on claimed method.

DETAILED DESCRIPTION OF THE INVENTION

Figure 1:
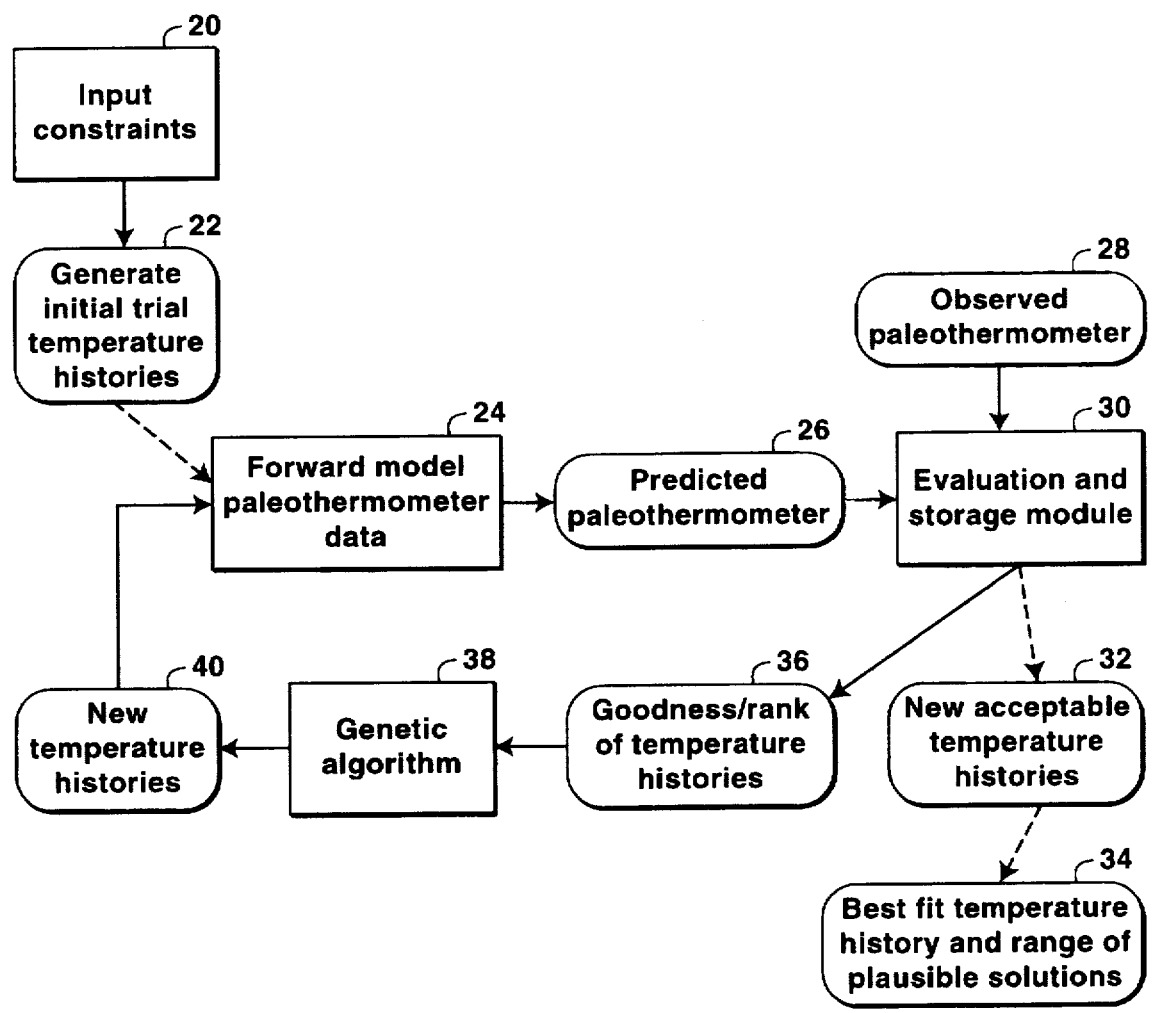
FIG. 1 depicts a schematic diagram of the steps of the present method.

The present multivariate method uses one or more types of paleothermometer observation data from one or more rock samples and a priori estimates of data quality, in the form of estimates of maximum and minimum error bounds on each data value, to determine temperature histories consistent with the data. Estimated paleothermometer values calculated from each candidate or trial thermal history are compared to the input paleothermometer observations. For each temperature history, a misfit to the observed rock data is computed by comparing estimated values to observed values. The misfit is evaluated with respect to the a priori estimates of data quality and compared to prespecified input criteria to determine the measure of fitness. The output of the method are families of candidate or trial temperature histories which fall within the prespecified input criteria for data quality bounds for each of the rock sample paleothermometer observation data values.

In a preferred embodiment, the method uses a genetic algorithm technique to efficiently search through the family of candidate temperature histories which may be consistent with the data samples. The genetic algorithm technique insures that characteristics of temperature histories that provide a good fit to the data are likely to reoccur in future candidate histories, thus finding optimal solutions faster than other stochastic techniques. Portions of the temperature history from the current candidates are incorporated into the candidate temperature histories of the next generation. The probability of reproduction of the better fitting characteristics of the current generation into the next generation is controlled by the data misfit.

The genetic algorithm is an efficient compromise between random searching of all possible temperature histories and conventional root-finding optimization techniques. The genetic algorithm technique also creates some random variations to insure that the variability or uncertainty in temperature history is well-represented. The technique allows a family of candidate temperature histories to be created and tested in each analysis, further increasing the efficiency of the technique over conventional techniques.

The method of the present invention can be usefully discussed with reference to the flow diagram depicted in FIG. 1, and the piecewise-linear temperature histories depicted in FIGS. 2 and 3. For simplicity, but not for purposes of limitations, this discussion relates to determination of candidate temperature histories for a single rock sample. The method begins at step 20 of FIG. 1 with the specification of input constraints on the candidate temperature histories.

The purpose of the method is to determine a family of candidate temperature histories consistent with the rock sample data. Each member of the family is characterized by a set of time and temperature values defining line segments in geologic time versus temperature plots, such as are depicted in FIGS. 2 and 3, and by an estimate of the fit of the line segments with respect to the error bounds on each sample value. The specification of direct temperature constraints at step 20 of FIG. 1 allow the incorporation of additional geological information into the method and provide control over the subsequent genetic algorithm solution search.

Rock temperature histories (which may also be referred to as sample temperature histories) in the method are free of burial history and heat-flow history controls of geology-based thermal models, and can therefore be simply represented by piecewise-linear functions of geologic time. The horizontal axis in FIG. 2 shows geologic time in megaannum, or million years from present, and the vertical axis shows temperature. The time and temperature of each of the segment endpoints, which are shown as points 1, 2, 3, 4, and 5 in FIG. 2, completely define the temperature history. In the method, the number of segment endpoints in the temperature history will be independently specified for each application. The five points depicted in FIG. 2 are for purposes of demonstration only, not for limitation. For clarity, the number of endpoints will sometimes be denoted in the following discussion by the variable N. The age of deposition is also shown for demonstration purposes only, not for limitation.

Although the purpose of the present method is to determine the temperatures of all endpoints, input data serve to constrain the range of values corresponding to the earliest and the most recent endpoints in the piece-wise linear time function. The earliest point in the temperature history, point 1 in FIG. 2, is the time of deposition of the particular rock sample for which the temperature history is to be evaluated. The temperature value for point 1, and an estimate of the error bounds on that value, can generally be tightly constrained by paleoclimate models. The most recent point, point 5 in FIG. 1, is the present time, which is geologic age zero. The temperature at age zero, and the associated error bound, can generally be constrained by temperature data or a calculated geotherm. Temperatures for deposition time and age zero are determined by methods which will be well known to those skilled in the art.

Temperatures of all endpoints in the temperature history are adjusted by the present method based on data deriving from various forward models, as is further described below. The method adjusts the temperatures within global temperature bound constraints which are also input to the method. These global maximum and global minimum temperatures, shown as dotted lines in FIG. 2, bound the range of possible temperatures in each candidate temperature history. No temperature history determined in the method can extend outside of these global temperature bounds.

From this discussion, it is clear that six parameters are required inputs to a preferred embodiment of the present method. These required inputs are global minimum and global maximum temperatures, deposition time, a temperature range at deposition time, age zero (which is always zero), and a temperature range at age zero. Note that these required inputs of the preferred embodiment are not limitations of the method, rather, these inputs limit the solution space searched by the method thereby ensuring the method is efficiently implemented.

In addition to these inputs, several optional input parameters may also be specified. First, a monotonic increase to maximum temperature may be specified. If this constraint is employed, temperature will never decrease before the maximum temperature in the history occurs. This constraint tends to produce smoother temperature histories. This method of doing so is an example only, not intended as a limitaion. The history depicted in FIG. 2 involves a monotonic increase in temperature from deposition time up to the maximum temperature, which occurs at point 3. In contrast, the candidate temperature history in FIG. 3 depicted by open circles does not have a monotonic increase and could not occur if this constraint is employed. This option may be employed when aspects of the geologic history, such as burial history, clearly indicate that, to within the precision of the available data, temperature increased monotonically to its maximum. This option might also be employed if available paleothermometer data were of a type that only constrained the portion of the temperature history following the time of maximum temperature. In the latter situation, any departure from a monotonic increase in temperature could not be resolved. These considerations will be understood to those skilled in the art.

Second, the temperature range and time range of the maximum temperature in the history may also be optionally specified. In FIG. 3, this range is depicted by the dotted line box centered approximately at geologic time 60 and temperature 140. This option may for example be employed when stratigraphic or structural information allow independent geologic control of the timing or magnitude of maximum temperature, or both. These constraints can be used to represent that geologic control.

Third, the maximum point in the temperature history can be specified. In the solid dot temperature history in FIG. 3, a maximum specified at point 2 forces the remaining endpoints in the history into the time range from approximately 70 mega-annum (Ma) to age zero, thereby allowing the method to better define the more recent cooling period of the history. On the other hand, in the open dot temperature history of FIG. 3, specifying the maximum at point 4 focuses the method on defining the adjustable endpoints to better define the earlier heating portion (open dots 2 and 3) of the temperature history. This option will be employed when aspects of the geologic history clearly indicate the approximate time at which maximum temperature occurred. This option might also be employed if the available paleothermometry data were of a type that allowed more detailed constraint of either the portion of the temperature history preceding the time of maximum temperature or the portion following the time of maximum temperature.

From the above discussion, it will be apparent that an N-endpoint temperature history has 2N-2 parameters that are to be specified by the method. For example, the example in FIG. 2 shows a temperature history with N=5. The time history has N endpoints, corresponding to N geologic times, with each endpoint having a temperature to be specified in the method (therefore resulting in N temperatures to be determined). However, as stated above, the times at deposition and at age zero will be fixed inputs, and those two parameters are not variables within the method. Therefore, in the example of FIG. 2, there are 2N-2=8 adjustable parameters: the ages of points 2-4, and the temperatures of all 5 points.

Once the input constraints on the candidate temperature histories have been specified, Step 20 of FIG. 1, a simple random number generator is used to generate an initial family of trial temperature histories, step 22 of FIG. 1. This initial family is not generated by the genetic algorithm, instead the random number generator is used because it is a simple, efficient procedure for initiating the method. Details on the specific manner in which this random number generator is used to generate the initial family are more conveniently described below in conjunction with the genetic algorithm. The size of the family may be determined by the analyst. In a preferred embodiment of the present method, a family size of twenty members has been experimentally found to thoroughly search the overall solution space, while completing the overall analysis in a reasonable computation time. Family size is not a limitation of the method.

Once a candidate thermal history, or family of candidate thermal histories, has been calculated, the method uses kinetic models of the constraints and paleothermometers to determine palcothermometer data values corresponding to the histories, step 24 of FIG. 1. This integrated paleothermometry approach of the present method takes advantage of the process of using both conventional constraints and inorganic palcothermometers to define all phases of a thermal history. See, for example, Clendenen et al., "Integrated Paleothermometry: Reconstructing the Thermal History of Sedimentary Basins," 1994 Annual AAPG Convention Program with Abstracts, V.3, Denver Colo., Jun. 12–15, 1994, p.122. Conventional constraints relate generally to the present day (zero age) temperature of a rock sample, and to organic indicators of maturity, such as vitrinite reflectance. The latter indicators are a measure of the maximum temperature the rock has achieved. On the other hand, inorganic palcothermometers define both heating and cooling histories. Although both types of constraints may be used in the present method, a preferred embodiment of the method will involve use of at least one inorganic kinetic model. For example, but not for purposes of limitation, the following conventional thermal-history constraints and inorganic paleothermometers may be employed in the present method:

| Conventional Constraints | Inorganic Paleothermometers |
|---|---|
| Present-day temperature | Smectite/illite |
| Level of Organic Metamorphism | Illite age |
| | Apatite fission track age |
| | Apatite fission track length distribution |
| | Fluid inclusion |

The present method employs models of these and other parameters which will be well known to those skilled in the art to determine the extent to which the candidate temperature histories are consistent with the rock sample data. Because each parameter provides specific well-understood insight into the rock sample temperature history, the more parameters which can be employed, the more likely that the resulting temperature histories will be accurate representations of the conditions to which the rock sample was subject over geologic time. The following paragraphs provide a further summary of the information which is obtained from some of the more commonly employed kinetic models.

Conventional Constraints:

In some basins, especially those at maximum temperature today, the conventional constraints provide significant insights into many thermal-history problems. For example, present-day temperature from bottom-hole temperatures and well tests is the only directly accessible part of a temperature history. In addition, organic-maturity indicators (also referred to as Level of Organic Metamorphorism), such as vitrinite reflectance, indicate the maximum temperature experienced during burial.

Inorganic Paleothermometers:

The smectite-to-illite transformation in shale is used to determine the heating history. The fraction of diagenetic illite reflects maximum burial temperature. Furthermore, the diagenetic illite can be dated using illite-age analysis to determine the time of heating. Fission tracks in apatite from sandstone help determine maximum temperature and define the cooling history. Fluid inclusion temperatures place lower bounds on maximum temperature, usually within 10° C. (about ½ LOM) of the true maximum temperature.

Each of the above parameters therefore provide information which can be used to further define the temperature history of a rock sample. For these reasons, among the kinetic models and input data which can be employed in the present method are: fraction of illite in smectite/illite; illite age; apatite fission-track age; mean fission-track length; distribution of fission-track lengths; and fluid inclusion temperatures. Other models which may be suitable for the method will be apparent to those skilled in the art.

For each candidate thermal history, the method uses these kinetic models to determine paleothermometer data values corresponding to the histories, step 24 of FIG. 1. Specifically, the candidate temperature history is input to each of the models. The output is a predicted value, also referred to as the calculated value, of the respective paleothermometer data values, step 26 of FIG. 1.

Actual values for each of the paleothermometer parameters will have been previously determined from the rock samples by laboratory and field measurements, step 28. At step 30, the predicted values and the actual values (which are also referred to in the art as the observed values) are compared. The thermal history is judged by how well the calculated values predict the observed paleothermometers. To perform that judgment, a quantitative measure of the misfit of the observed to the predicted data is then calculated to determine whether the candidate thermal history produces an acceptable fit to the data.

Many measures of misfit of predicted to measured data will be known to those skilled in the art. The measure of misfit described below is also employed in the objective function that controls the search for better solutions (as is discussed further below), and was selected for convenience. It is not to be construed as limiting.

The data misfit for single-valued kinetic model data outputs, such as LOM, illite fraction, illite age, mean fission track length, and apparent fission track age, can be represented by a simple normalized data misfit functional form. One form which has been employed, where the normalized misfit is the parameter $\delta$, is given by:

$$\delta = \begin{cases} 1 + 3\frac{v_L - v_c}{v_o - v_L} & v_c < v_L \\ \frac{v_o - v_c}{v_o - v_L} & v_L \leq v_c < v_o \\ \frac{v_c - v_o}{v_U - v_o} & v_o \leq v_c \leq v_U \\ 1 + 3\frac{v_c - v_U}{v_U - v_o} & v_U < v_c \end{cases}$$

where $v_c$ is the calculated value, $v_o$ is the observed value, and $v_U$ and $v_L$ are user-specified a priori upper and lower bounds surrounding $v_o$ that define an acceptable fit. The upper and lower bounds define a range surrounding the observed value within which the calculated value must fall. The values of the upper and lower bounds will be determined by the analyst based on such factors as the relative confidence in the observed data value, and other considerations which will be known to those skilled in the art. When the calculated value falls within $v_U$ and $v_L$, $\delta$ will be less than or equal to 1, and the fit may be deemed "acceptable".

Figures 4, 5A, 5B:
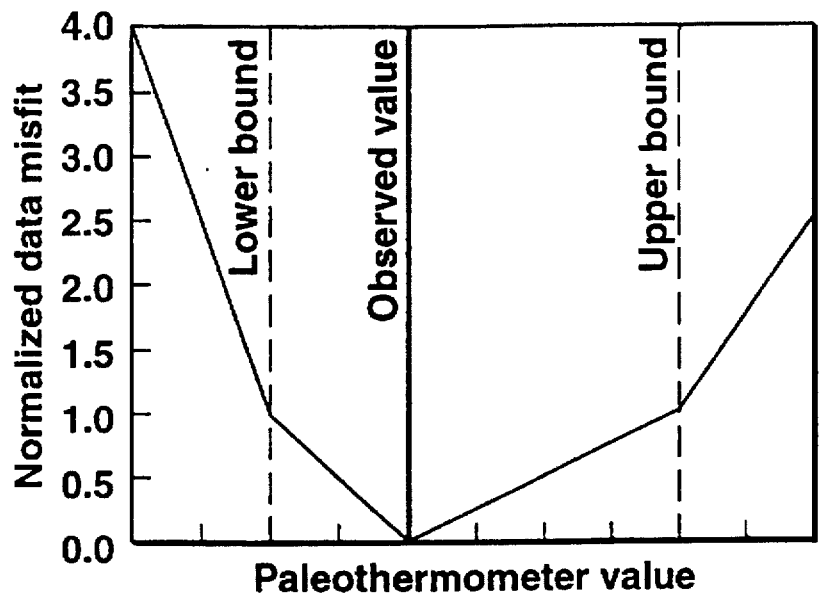
FIG. 4 depicts an example of a normalized measure of data misfit such as could be incorporated into embodiments of the present method.
FIG. 5A depicts a bit-string representation of a temperature history such as could be incorporated into a genetic algorithm embodiment of the present method.
FIG. 5B depicts a binary representation of a temperature value in the present method.

The misfit measure described by the above functional form is shown in FIG. 4. In this figure, the solid vertical line signifies the location at which the calculated and the observed values are identical. The horizontal scale is normalized by the difference between the upper bound and the observed value, and by the difference between the lower bound and the observed value, respectively. Note that the upper and lower bounds need not be symmetric about the observation. Furthermore, note that the slope of the function outside of the upper bound is not required to be the same as the slope of the function outside of the lower bound. Finally, note that the form depicted "punishes" calculated values relatively more heavily the greater the difference between the calculated value and the observed value. These conditions have been experimentally found to be preferred characteristics of the misfit measure in the present method, but are not considered to be mandatory aspects of the misfit measure. Other misfit measures will be apparent to those skilled in the art.

Certain kinetic model outputs will not be single-valued parameters, but will rather be in a distributional form. For such parameters, the measured to calculated misfit function cannot be single-valued, such as above, but must also be in distributional form. One example of such a parameter involves calculated and observed fission track length distributions. Calculation of a misfit parameter for such distributional-form parameters can be performed by use of a chi-squared ($\chi^2$) statistic, such as the following:

$$\chi^2 = \sum_{k=1}^{20} \frac{(n_k/n - q_k/q)^2}{n_k/n}$$

wherein $$n = \sum_{k=1}^{20} n_k, \quad q = \sum_{k=1}^{20} q_k,$$

$n_k$ is the number of observed tracks with lengths between k and k-1 microns, and $q_k$ is the number of calculated tracks with lengths between k and k-1 microns. In this statistic, the summation is performed over the number of one-micron length increment bins into which measured fission tracks are sorted for the purposes of developing a track length distribution. As will be understood to those skilled in the art, twenty bin sorting is standard in fission track analysis. Use of observed fission track length distributions will often require consideration of data biases in the count of short tracks. Short tracks are generally harder to resolve microscopically, are less likely to be etched, and the physical and kinetic mechanisms of shortening may be different than for longer tracks. As will be understood to those skilled in the art, it is therefore common to exclude short tracks, i.e. tracks shorter than about 6 mm., from the chi-squared statistic determination.

Once the chi-squared statistic has been computed, the normalized misfit is defined as:

$$\delta = \chi^2/\chi^2_U,$$

where $\chi^2_U$ is a user-defined a priori acceptability bound on the $\chi^2 \cdot \chi^2_U$ can be related to a confidence interval on the comparison by using a $\chi^2$ distribution with n degrees of freedom, where n+1 bins contain fission track data (which, if short tracks are excluded, excludes the short track bins). The acceptability bound defines a range surrounding the observed value within which the calculated value must fall. As above, values of $\delta$ less than or equal to 1 denote an acceptable fit between the calculated and observed distribution.

In the present method, data misfit values are calculated as described above for each temperature history. A temperature history is deemed "acceptable" only if $\delta$ is less than or equal to 1 for every observed data value (that is, only if all observed data values are matched by the calculated data value within the specified bound). If a candidate temperature history meets this acceptability standard, it is deemed to be "acceptable," that is, it is considered a plausible solution to the temperature history for the observed dataset, step 32 of FIG. 1, and is retained for subsequent analysis, step 34. Those temperature histories which do not meet this standard are not retained at step 32.

It is a characteristic of the present method that candidate temperature histories from each analysis are used to determine the candidate temperature histories to be evaluated in the subsequent analysis. Each analysis sequence is referred to as a generation of the method. For example, the first generation begins with step 22 of FIG. 1, and continues through step 32. The genetic algorithm technique described below determines the next set of temperature histories to be analyzed, step 38. That set of histories comprises the second generation of the method and the method then proceeds from step 40 through steps 32 and 36. The manner in which the histories for the subsequent generation is determined begins with the calculation of a total normalized misfit, in the form of an objective misfit function, as is described next, with reference to step 36 of FIG. 1.

An objective fitness function, built from the individual data misfit values $\delta_i$ described above, provides a means of determining the solutions which best-fit the observed data values. The total normalized misfit, J, is formed from a weighted sum of the misfit values calculated for the rock sample, as follows:

$$J = \frac{\Sigma w_i \delta_i}{\Sigma w_i}$$

where $w_i$ are weighting factors for the misfit of each observed data value, and $\delta_i$ is the misfit calculated following the procedures defined above for each of the observed data values. The weighting factors are determined a priori for each misfit parameter. Generally, the weighting factors are given equal weight for all observed data values. However, as will be understood to those skilled in the art, the weighting factors can be adjusted based on the analyst's relative confidence in one observation, as compared to other observations, and other similar considerations. The summation in the equation is over all observed data values for which a misfit is calculated. Candidate temperature histories with lower values of J are more fit; that is, they provide a closer approximation to the observed paleothermometer data.

Fitness function J is used to determine the fitness of the solutions in the present generation of the method and the relative weight to be given to the characteristics of those solutions for propagation into the next generation of the genetic algorithm. Fitness function J is evaluated for each candidate temperature history in the present generation. For example, in one embodiment of the method, twenty candidate histories may be generated in each generation; thereafter, at step 36, all twenty candidates are ranked. The probability of a candidate reproducing into the next generation of the genetic algorithm is determined from that candidate's misfit ranking in the family of twenty.

Acceptable candidate temperature history solutions will always have a total misfit below 1.0. Solutions that are not acceptable will usually have total misfit greater than one. Occasionally, however, the total misfit may be less than one for an unacceptable solution which may have one $\delta_i$ slightly greater than one, and all other $\delta_i$ values much less than one. However, as noted above, any such candidate will not be deemed acceptable due to the $\delta_i$ which is greater than one. Whether a candidate temperature is deemed acceptable or not, all twenty members of the family are retained in the genetic algorithm discussed below and used to determine the next generation of temperature histories to be evaluated.

As indicated above, candidates for the next generation are derived from the candidates of the current generation, i.e. portions of the temperature history from the current candidates are incorporated into the candidate temperature histories of the next generation. The genetic algorithm operates to ensure current candidates with lower total misfit, J, are more likely to have information incorporated into the next generation of candidates. Small random perturbations are also made in each generation so the final results are not too severely limited by the candidates in the earlier generation. In addition, each temperature history must satisfy the direct temperature history constraints, such as the maxima and minima discussed above.

The genetic algorithm ("GA") is a search technique in which a set of search points (for example, a set of 20 temperature histories, or any other discrete number of temperature histories within the handling ability of the selected computer) are evaluated and evolved through many generations in order to find a globally optimal solution. The genetic algorithm addresses at least three important facets of the search for optimal solutions to the paleothermometric inverse problem. First, the goal of the search process is to find not only the best temperature parameter set, i.e. that set $\{(t,T)\}$ of times t and temperatures T, which minimize the objective function, but also a variety of different parameter sets $\{(t,T)\}$ which are consistent with the specified observation bounds.

Second, because the computations of individual misfit values involve complex forward modeling computations, misfit function J is nonlinear. Therefore, the surface of the misfit function may be complex with many local minima. That complex surface must be thoroughly searched to accurately determine the range of temperature histories consistent with the paleothermometric data. Third, the search space is very large. For example, if one wants to represent a temperature history with 5 time and temperature points, the number of unknown parameters is 10. Assuming the ranges of time and temperature are 0 MY to 100 MY and 0 degree Celsius to 200 degree Celsius, respectively, and the desired resolution is 5 MY and 10 degrees, respectively, a complete search space would contain about 20 to the 10th power candidate temperature histories.

For these reasons, and due to the specific objective of finding a variety of acceptable solutions, traditional optimization techniques which are sensitive to initial starting positions are inadequate. However, stochastic search algorithms such as genetic algorithms and simulated annealing routines are less sensitive to the initial starting point and tend to avoid local minima. Therefore, in a preferred embodiment of the present method, a genetic algorithm (GA) is employed because it also uses the measure of fitness in the stochastic search algorithm to more efficiently generate updated trial temperature histories. GA was selected in the present method because of the options which can be used to control premature convergence and to ensure a comprehensive search of the overall solution space, whereas in simulated annealing the only control mechanism for the paleothermometric inverse problem is the annealing routine's cooling rate. The following paragraphs describe one embodiment of GA for use in the present method. For a more detailed description of GA, see Goldberg, *Genetic Algorithms in Search, Optimization, and Machine Learning*, Addison-Wesley, 1989 (ISBN 0201157675).

A key characteristic of GA is its representation of a search point as a string of binary code. In the paleothermometric inverse problem, the search point is the temperature history. In an embodiment of the present method in which the temperature history is depicted as a piecewise linear functional form, that temperature history is defined by N pairs of time and temperature. However, as stated above, the initial and final times are specified, i.e. $t_1$ and $t_N$ are the known deposition time and present time. Therefore 2N-2 parameters, namely $t_2, t_3, \ldots, t_{N-1}, T_1, T_2, \ldots, T_N$, describe a temperature history. To implement the GA technique efficiently, the resolution of the time and temperature parameters must be specified.

For example, for the genetic algorithm, each independent temperature history parameter (time and temperature at each segment endpoint) may be represented by an 8-bit code that divides the available time or temperature intervals into 256 ($=2^8$) uniformly distributed parts. The choice of 256 uniformly distributed parts as the resolution is not a limitation of the present method. Other distributions may be chosen in the method, although distributions which are powers of two will be characteristic of preferred embodiments of the present method. It will be understood that other resolutions may be employed in the method based on such considerations as computation time constraints and the relative complexity of the temperature history to be represented in the method.

Figure 2:
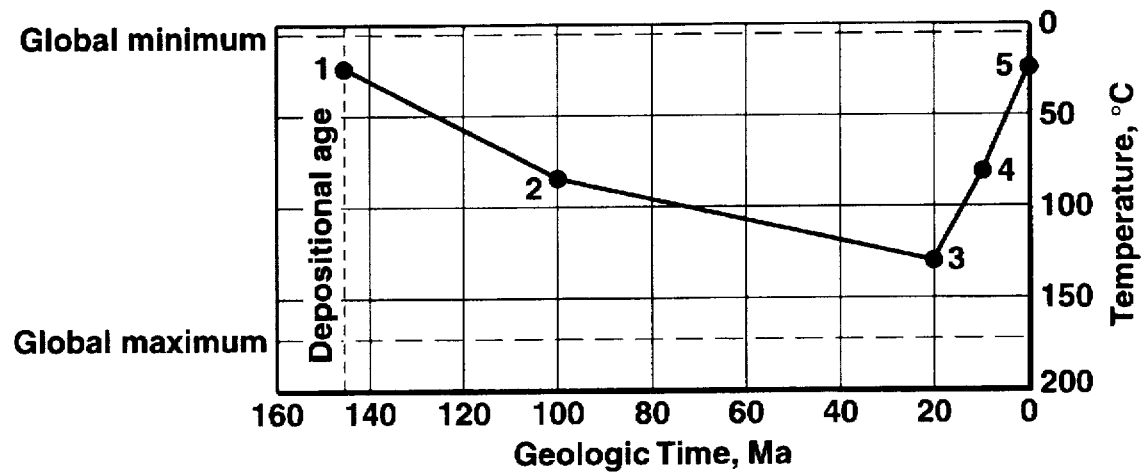
FIG. 2 depicts an example of a piecewise-linear temperature history such as would be generated under the present method.
Figure 3:
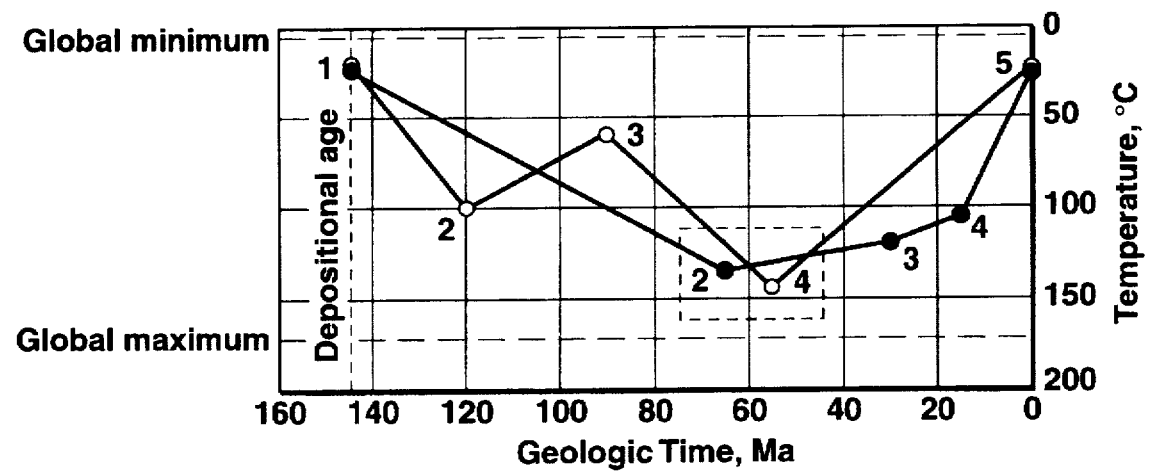
FIG. 3 depicts an example of direct constraints on two piecewise-linear temperature histories such as could be incorporated into embodiments of the present invention.

In the case in which 256 ($=2^8$) uniformly distributed parts is chosen for the GA, temperature histories will have a time resolution of $t_a/256$, where $t_a$ is the depositional age of the oldest sample (corresponding to the age of point 1 in FIG. 2). The temperature resolution will be $(T_{max}-T_{min})/256$, where $T_{max}$ and $T_{min}$ are the global minimum and maximum temperature limits specified as input constraints and as depicted in FIG. 2.

As will be understood to those skilled in the art, until raised to a hot enough temperature, apatite grains retain fission tracks accumulated since cooling from melt, perhaps hundreds of millions of years before deposition in the sedimentary basin. Thus, when a sample includes fission track data, it may be necessary to model the thermal history of the apatite grains prior to deposition. When this is done, additional pre-depositional points are provided for the temperature history of the sample. The time and temperature of these points are also represented by 8-bit codes. The time resolution of the pre-depositional part of the history is $(t_{max}-t_a)/256$, where $t_{max}$ is the oldest allowable age. The temperature resolution for pre-depositional temperature history is the same as the post-depositional resolution shown above. The present method allows such pre-depositional temperature history information to be explicitly incorporated in the inverse modeling of multiple paleothermometers, a capability not available in the prior art.

Using this 256 uniformly distributed resolution, each time and temperature parameter value is therefore characterized by, i.e. coded into, an 8 bit number. The result of this coding is that each complete 2N-2 parameter temperature history will involve a 16(N-1) length bit string. FIG. 5A depicts a graphical representation of such a temperature history, with an example 8 bit number indicated for the first member of the history (i.e. temperature $T_1$) in FIG. 5B.

As described above, at the start of the present method, a random number generator is used to determine the initial trial temperature histories, step 22 of FIG. 1. This determination is performed by assigning random bit values to each bit in the 16(N-1) length bit string. Each bit is either "0" or "1," based on a fifty-fifty uniform probability distribution. As indicated above, one embodiment of the present method involves generating a family of 20 candidate temperature histories. Therefore, the result of this step is that a family of 20 bit strings of length 16(N-1) is generated, thereby generating 20 random temperature histories. Fitnesses of these initial temperature histories to the observed data are computed, as was described above. The result of this computation is the determination of fitness function $J^0_i$, where i=1-20 for a 20 member family of temperature histories, and where the result of the random number generation of those histories is considered the $0^{th}$ generation. The GA is used to generate the subsequent generations.

Each temperature history is referred to in the following, for convenience only, as $S^0_i$, again where i=1-20 for a 20 member family of temperature histories, and where the result of the random number generation of those histories is considered the $0^{th}$ generation. The GA uses the current population of 20 bit strings, $S^O{}_i$, and their fitness measures $J^O{}_i$ to generate a new population of 20 bit strings, $S^1{}_i$, which is referred to as the first generation of temperature histories. The specification of each next generation by the GA is performed through use of three genetic operators, namely reproduction, crossover, and mutation. These operators will be familiar to those skilled in the art. In a preferred embodiment of the present method, the GA routine employs a rank-based roulette wheel type reproduction operator, a parameter-wise crossover operator, and an adaptive mutation rate operator which is computed based on population similarity. A preferred embodiment of the method will also employ a niche-based sharing scheme in which the similarity computation is based on both the 20 most recent members of the candidate temperature history family and on a set of the twenty previously computed temperature histories which are rated the best yet found, based on misfit measurement values.

The reproduction operator creates a new population of 20 bit strings by selecting and copying bit strings from the current population in a probabilistic manner. The probability of a particular bit string, $S^O{}_i$, being selected for a subsequent generation is proportional to its fitness $J^O{}_i$.

$$Pr(S^O{}_i) \sim J^O{}_i(t,T)$$

This process favors bit strings whose predicted values match well with the observed paleothermometers. A standard GA technique is one in which the proportionality in the above reproduction operator is based on the ratio of the fitness of the bit string to the summation of all fitnesses in the population. This technique is sometimes referred to as a roulette-wheel type operator. Members of the next population are determined by a random number selection of members of the previous population, where the random selection is weighted by the above stated fitness ratio. However, this technique suffers from a tendency to overweight the members of the previous population which have higher fitness values. An alternative scheme, referred to as rank-based roulette wheel scheme, reduces that tendency. In this scheme, the previous population members are ranked, from one to twenty, based on the above described ratio. The random number selection of the next population is then weighted by the rank order of the fitness ratios. For example, the highest rated member will be twenty times more likely to be selected for the next population than is the lowest rated member. In a preferred embodiment of the present method, this rank-based roulette wheel scheme is used to determine the next members of the next generation of temperature histories to be evaluated. As will be apparent, all new members will have been present in the previous generation, but the overall mix of members will have been altered by the rank-based scheme. These members are selected in pairs, and the crossover operator described below is then applied to each pair.

In GA, crossover is the major operator exploring for new and better search points. The crossover operator changes the bit strings in the new pair of members by splicing together parts of the bit strings. By recombining existing partial bit strings from selected populations, this crossover operator has a good chance of creating newer and better bit strings. As described above, each temperature history is characterized by a parameter string 2N-2 parameters long, with each parameter 8 bits in length. Therefore, the total length of each bit string is 16(N-1) bits. The standard GA crossover technique is to use a random number generator to determine a crossover point in the entire 16(N-1) bit string. In other words, the random number operator will randomly select a point which separates each member of the pair of bit strings into two parts. The same random number is used for each member of the pair. The crossover then occurs by switching corresponding halves of the two bit strings to form two new bit strings. For example, the two rightmost halves of the bit strings may be switched. Another standard GA technique is to use the random number generator to determine two crossover points, thereby dividing each bit string into three sections. In this technique, the middle section of the three is most commonly switched, although other choices could be made.

The above crossover method is generally considered to relatively slowly search a solution space. Therefore, a preferred embodiment of the present method involves use of a parameter-wise crossover operator. In this embodiment, a separate crossover operator is used for each 8 bit parameter in the parameter string. For each parameter, a two step process is followed. First, a random number is used to divide the 8 bit parameter into two sections. For example, the parameter may randomly be divided into a group of five bits and a second group of 3 bits. Second, a second random number determines whether the upper or the lower section of the parameter is switched. This process repeats for all 2N-2 parameters in the bit string. The parameter-wise crossover operator generally provides a more extensive, global search of the solution space, and also prevents premature convergence.

After completion of the reproduction and crossover operations, new bit strings have been generated which represent new candidate temperature histories for evaluation. The third operator, the mutation operator, perturbs the newly generated bit strings by randomly altering some of the bit values. The function of mutation is to add new bit information not present in the initial random bit strings. However, the mutation probability is kept very small so as not to disturb the crossover operator's search capability. In one embodiment of the method, a standard mutation operator may be applied in which each bit in each bit string is individually considered for mutation. For example, a base mutation rite may be employed whereby each bit has a fixed probability of being switched from its initial state to the opposite state. For example, a bit with a "1" value may have a 5% chance of being switched to a "0" value and vice versa. Again, a random number generator governs the switch determination. Mutation operators aid the search process by ensuring a wide search is performed. The 5% probability used in this example is common in GA, but is not limiting.

A preferred embodiment of the present method involves use of an adaptive mutation rate. In this embodiment, a total similarity value is computed for the current family of temperature histories before the reproduction, crossover, and mutation operations are performed. This value may typically be computed using Euclidean distance calculations, which will be understood to those skilled in the art. In this calculation, the relative differences among the individual time and temperature values in the current family is calculated. That difference is then used in a distributional form selected by the analyst. For example, a normally distributed form such as is described further below in conjunction with the niched GA technique would be employed in a preferred embodiment of the method. That form depicts the similarity $G(t_c, T_c)$ of one candidate temperature history $(t_c, T_c)$ to the members i in the family. Where this form is employed, an additional summation over all twenty members of the current family results in a total similarity value of the family. In the normally distributed form shown below, it will be understood that, if all temperature histories are close, or identical, to each other, the similarity will be high. In such a case, a relatively high mutation rate may be applied, in an attempt to induce more variability into the next family. On the other hand, if the similarity is low, then a lesser need of inducing more variability will be present, and the mutation rate which is applied will be relatively low. The range of mutation rates to be employed will be specified for each analysis; however, in practice, a continuum of mutation rates, as a function of similarity, will be used, for example ranging exponentially from 0.05 down to 0.01 probability of mutation. Alternative similarity function forms, such as triangular distributional forms, may also be applied.

In another embodiment of the method, a two part mutation continuum may be used. In this embodiment, the mutation rate will be the sum of a generational term and a similarity term. The generational term may for example be of the following form:

$$P_{gen}=(0.9)^{gen}*0.05 \text{ if gen} \leq 15$$

$$P_{gen}=0.01 \text{ if gen}>15$$

where the exponent gen is the generation number of the family. Note that, as above, this term exponentially decays from 0.05 down to 0.01. The similarity term may be of the form:

$$P_{sim}=0.19*(TS-20)/40 \text{ if } 20 \leq TS \leq 60$$

$$P_{sim}=0.19 \text{ if } TS>60$$

In this term, the total similarity TS is computed as above for the current family prior to reproduction, crossover, and mutation. Since the total similarity TS is summed over all twenty members of the population, it will be understood that the minimum total similarity value, assuming the above described normally distributed form, for a twenty member family will be twenty. Because a low similarity value indicates high variability in the population, there is no need for increasing the mutation rate; therefore, the similarity mutation rate is zero at a total similarity value of twenty. On the other hand, it has been found experimentally that a twenty member population with a total similarity value of sixty or more has relatively low variability, and therefore the mutation rate is constant at the maximum value of 0.19 for all similarities at or above the value sixty.

In this two part adaptive mutation rate embodiment, the mutation rate used is the sum of the above two terms, $P_{gen}$ plus $P_{sim}$. This two part rate helps ensure an efficient, wide search that results in a variety of solutions, and is a preferred embodiment of the present method.

The family of new temperature histories, represented by the family of new bit strings $S^1_i$ for generation 1 is now evaluated to determine the misfit function $J^1_i$ for generation 1. This evaluation follows the procedure described above in conjunction with steps 24 through 32 and 36 of FIG. 1. Thereafter, the method repeats until predetermined stopping conditions are met. For example, the method may terminate when a predetermined number of acceptable solutions are found or when a specified number of generations have been generated. Other termination criteria may also be used.

As stated above, acceptable solutions are defined as the temperature histories whose corresponding paleothermometer values fall within the limits of the observation uncertainties specified by the upper and lower limits of the observed paleothermometers. Upon termination of the GA, a complete collection of acceptable solutions serve to define the bounds of the temperature histories which are consistent with the observational uncertainties. This collection can contain a number of families of similar temperature profiles. This collection is retained at step 34 for subsequent use in characterizing the geologic region from which the observed data were derived.

As discussed above, the problem of estimating a temperature history from observed paleothermometers is nonlinear, and may not have a unique solution. Moreover, uncertainty in observed paleothermometers further complicates the problem. Therefore, there is no guarantee that a mathematically optimal solution, from the viewpoint of the objective function, is the best geologic solution. In some cases, certain suboptimal solutions are geologically more meaningful than the globally optimal solution. Even though the GA discussed above is a powerful search process, it nevertheless may have a tendency to zero in on an optimal or a suboptimal solution, with all subsequent population members thereafter becoming similar to each other. Generally, this results from the crossover operator not generating new types of bit strings, thereby limiting the extent to which solutions with other characteristics are investigated by the method. This result is generally known as premature convergence. To avoid this problem, and ensure that many suboptimal solutions are investigated, a preferred embodiment of the present method involves use of a modified GA referred to as a niched GA.

In the GA embodiment described above, a bit string with a very high fitness, i.e. small misfit value, may dominate the reproduction process, and all other bit strings may become extinct in the next generation. To avoid such premature convergence, a sharing scheme is used to induce niches for less well-performing bit strings. In this scheme, the fitness of a bit string is forced to be shared by similar bit strings, thereby lowering the effective fitness of a bit string when it has many similar bit strings in the current population. A bit string with a large similarity value indicates an abundance of similar bit strings in the current population, and will be discouraged to reproduce. This provides a better chance for less well-performing bit strings to evolve.

The measure of similarity of one candidate temperature history $(t_c, T_c)$ to a set of temperature histories is computed as:

$$G(t_c, T_c) = \sum_{i=1}^{n} \exp\left(-\left[\frac{<t_c-t_i, t_c-t_i>}{\sigma_t^2} + \frac{<T_c-T_i, T_c-T_i>}{\sigma_T^2}\right]\right)$$

where n is the number of temperature histories to which the candidate c is compared, i.e. the 20 members of the current generation, and the 20 "best" solutions from all preceding generations of the GA. A preferred embodiment of the present method employs use of n=40 for the similarity which is computed for the niched genetic algorithm. Other embodiments may calculate similarity with respect to only the 20 members of the current generation, for example. The denominator terms in the exponential are user-selected input terms. Empirical results indicate that $\sigma_t$, the niche sensitivity parameter for time, may typically be 20 Ma, and $\sigma_T$, the niche sensitivity parameter for temperature, may typically be 20° C. Larger values tend to affect the niche routine more strongly. In this equation $t_c$ is the vector of ages in the candidate temperature history being evaluated, $T_c$ is the vector of temperatures in the candidate temperature history being evaluated, $t_i$ is the vector of ages in the ith temperature history being compared, $T_i$ is the vector of temperatures in the ith temperature history being compared, and $(x_1, x_2)$ is the inner product (or scalar product or dot product) of vectors $x_1$ and $x_2$.

When the niched genetic algorithm is used, the fitness $J_c$ for a bit string c is divided by the similarity measure $G(t_c,T_c)$. Therefore, the probability of a particular bit string, $S^o_c$, being selected for a subsequent generation is proportional to:

$$Pr(S^o_c) \sim J^o_c(t,T)/G(t_c,T_c)$$

This has the effect of moving the search effort from previously found good solutions to unexplored solution space, thereby ensuring that the final output of the method broadly characterizes the family of solutions applicable to the observed data values. Niche routines are sometimes referred to as standard similarity sharing schemes, and will be understood to those skilled in the art.

The above description is applicable to embodiments of the present method for which the thermal history describes a single rock sample. When multiple rock samples are available to be analyzed, a joint inversion of the data from the multiple rock samples is required. This joint inversion requires the simultaneous consideration of different temperature histories for each rock sample. As will be well known to those skilled in the art, there may be implicit relationships between the thermal histories in multiple samples which will act as additional constraints on the method. In addition, explicit relationships may be specified for individual analyses, as will be determined by the analyst.

In multiple sample analyses, a distinct temperature history is calculated for each sample. Additional constraints can then be employed which interrelate the distinct temperature histories. For example, the temperature histories of the different samples can be coupled by defining the range of temperature difference between sample histories. This is illustrated by the dashed envelope in FIG. 6, where the younger sample is required to be 40° to 80° C. cooler than the older sample. Although in this example the temperature histories are required to be parallel, that is not a limitation of the method. Furthermore, the range defining the temperature difference between sample histories may vary with geologic time. The specified temperature difference between samples must be broad enough to allow for realistic changes in gradient through time due to heat flow variations, compaction changes, and other effects, yet tight enough that a paleothermal data constraint in one sample exerts some influence on the thermal history of other samples. These considerations will be understood to those skilled in the art.

Figure 6:
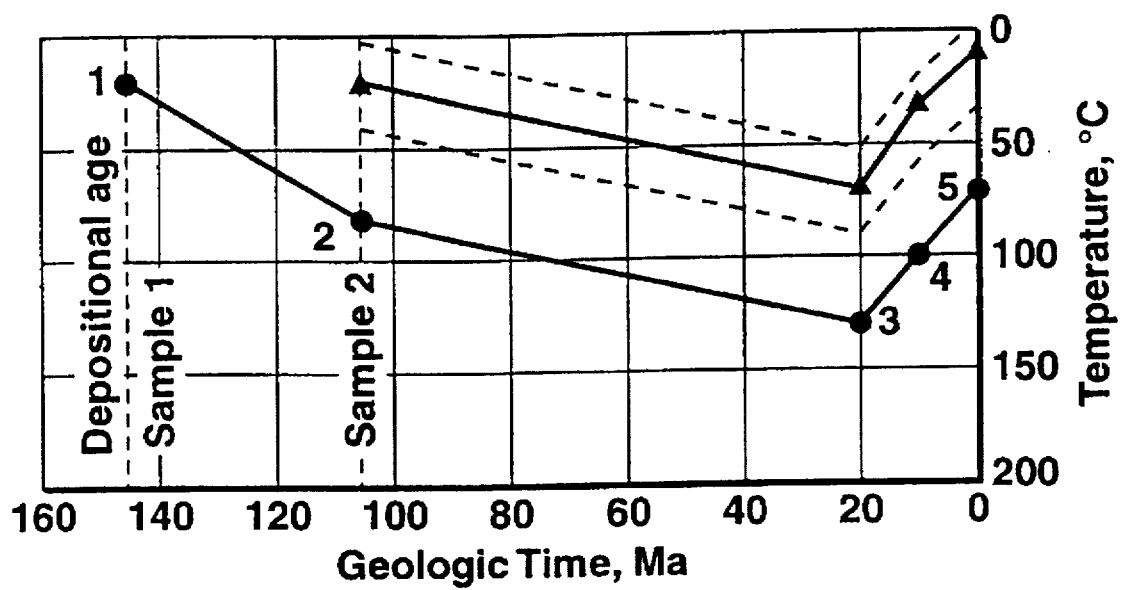
FIG. 6 depicts an example of constraints between piecewise-linear temperature histories for a multiple sample embodiment of the present method.
Figure 7:
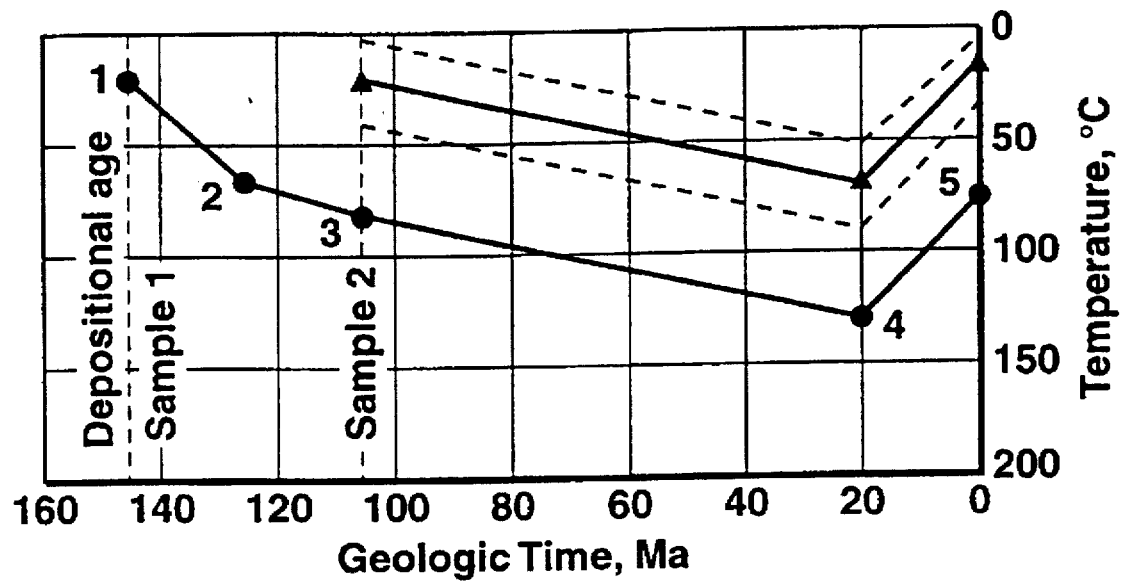
FIG. 7 depicts an alternative example of constraints between piecewise-linear temperature histories of the present method.

In multiple sample analyses, the number of endpoints, N, applies to the oldest temperature history, such as the solid circle temperature history in FIG. 6. However, for other temperature histories the number of endpoints will generally have fewer than N endpoints. The solid triangle history in FIG. 6 has fewer than N endpoints. For each sample temperature history, the starting age is the depositional age of that sample. Typically, temperature histories will look like FIG. 6, without free points occurring between the deposition of all layers. In FIG. 6, endpoint 2 for sample 1 occurs at the same geologic time as the first endpoint of sample 2. This is not a limitation of the present method; rather embodiments of the method exist which allow temperature histories with free points between depositional ages of each sample. Such an example is depicted in FIG. 7, where endpoint 2 of sample 1 occurs prior to the first endpoint of sample 2.

The computational effort increases with the number of samples included in the inversion. For that reason, geologic data from rocks with similar temperature histories may be combined. For example, because temperature gradients are usually less than about 40° C./km, geologic paleothermometer data collected over a depth range of up to about 150 meters (500 feet) will experience temperatures no more different than about 5° C. Such data may typically be combined into a single observed data sample for the purposes of the present method. Care must be taken to ensure that data from rocks with significantly different ages or with drastically different thermal histories are not combined. For example, data across a major unconformity should not be combined. These considerations will be understood to those skilled in the art.

In multiple sample analyses, temperature histories that do not obey the constraint on temperature difference between samples are not evaluated as candidate solutions. Other temperature histories are evaluated using the misfit functions described above.

In multiple sample analyses, the GA implementation discussed above is retained, with the principal difference being that the bit string will be lengthened due to the additional parameters related to the additional samples. However, the length will not be directly proportional to the number of samples, since there will typically be additional constraints placed on the second and other samples. Specifically, although both time and temperature will be variables for the first sample, the second sample will typically be constrained to determine temperatures for each of the same geologic times which are determined for the first sample. Therefore, the bit string will begin with the sequence of time and temperature parameters which are to characterize the first sample, and will then be lengthened by the temperatures for the second sample. However, because the first portion of the string will specify the times for both the first and second samples, the string is not lengthened by additional time parameters. The lengthening of the bit string may be in terms of absolute temperature parameters, or may be in terms of temperature differences relative to the first sample temperatures. Constraints on multiple sample analyses will be understood to those skilled in the art.

The output of the method consists of all candidate temperature histories which meet the input criteria. These candidates are retained at step 32 of FIG. 1. For complex cases, it may be necessary to collect hundreds of candidate temperature histories. A variety of analyses can be performed with these candidates.

First, tables of fit statistics may be generated which show how often each input data constraint was acceptably fit by a candidate temperature history. These statistics can be used to identify which data are providing the most sensitive constraints on the thermal history. They may also provide an indication of inconsistent or unreliable data values.

Figure 8:
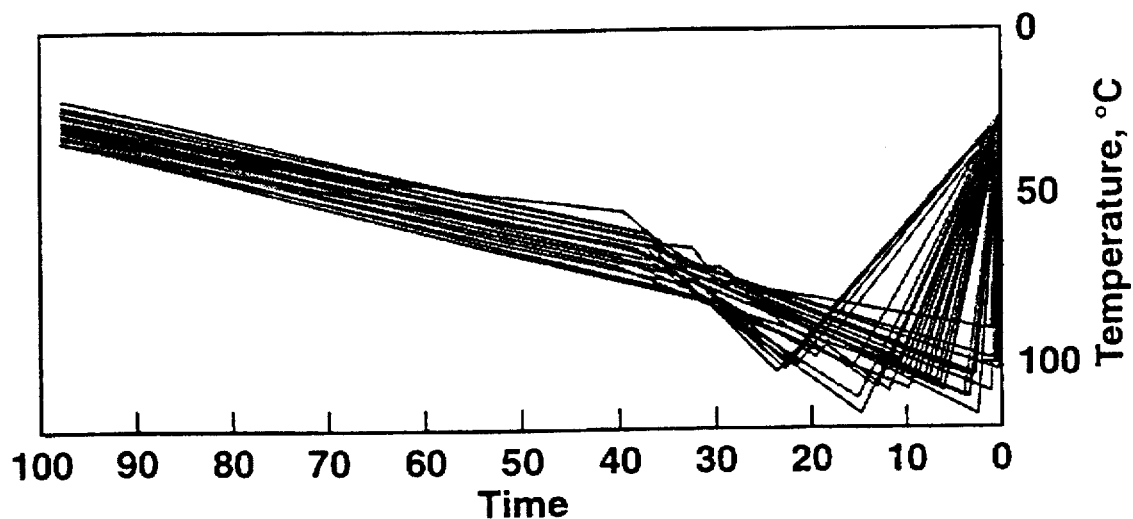
FIG. 8 depicts a typical display of temperature histories found from a single sample analysis of the method.

Second, the temperature history results may be reviewed and interpreted graphically. FIG. 8 shows a family of acceptable solutions found from LOM, illite fraction and illite age data. Each piecewise-linear curve on the graph represents a temperature history that acceptably fit the constraining data. In this example, approximately 100 acceptable temperature histories were found. As will be understood to those skilled in the art, the illite data in this example rather tightly constrain the heating portion of the temperature history. Therefore, the older portion of the temperature histories, older than approximately 40 Ma, all fall within a relatively narrow temperature range at any given geologic age. However, none of the data used in this example provide significant information about the more recent portion of the history, so the acceptable solutions show much more variation in that age range.

Third, the best "n" temperature histories may also be retained, where "n" is some pre-determined integer. In practice, we find 20 to be a useful and practical value for "n". "Best" is considered to be those temperature histories with the smallest absolute overall misfit function value. Note that, as indicated above, the "best" solutions may or may not be acceptable. These "best" temperature histories may nevertheless provide some physical or geological insight, even if they are not acceptable.

Figure 9:
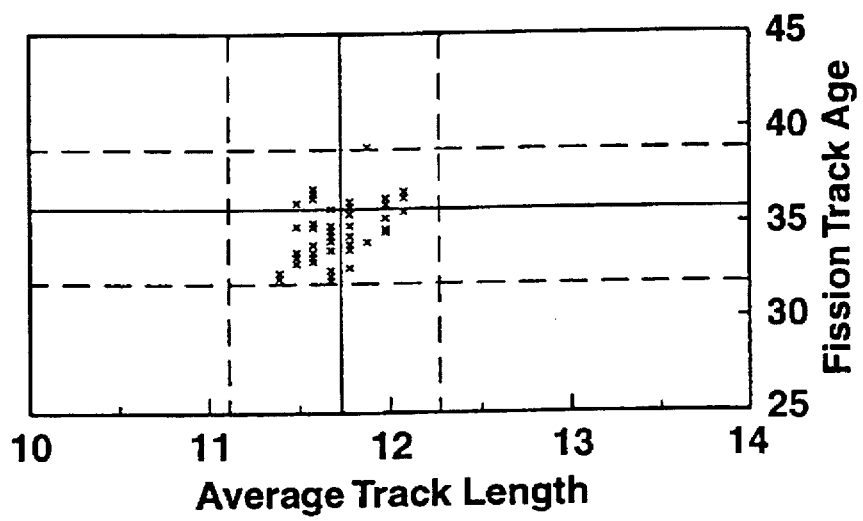
FIG. 9 depicts a cross-plot display of the results for average track length versus fission track age for the present method.

Fourth, the thermal histories can be interpreted using cross-plot characteristics. This interpretation may be employed for either the acceptable histories or the best histories. FIG. 9 shows an example and also depicts the cross-plot showing the requested variables. Each point on the plot corresponds to one of the temperature histories found by the method. Cross-plots can provide useful insight into the interplay between the various constraints and the solutions which have been generated.

Those skilled in the art will recognize that standard preliminary considerations, applicable generally to all methods in which analytic and calculated results are to be compared, should be performed to facilitate use of the present method. Specifically, the paleothermometry data to be used should be high-graded, that is, categorized by quality and relative confidence in the measured parameters deriving from the data. The data should also be reviewed, along with any other applicable information for the geologic region being evaluated, to ensure that the method results in geologically sensible solutions. Any such applicable information should be used to determine the input constraints to the method, since the results of the method will be influenced by the set-up parameters.

A number of additional embodiments of the present method will be apparent to those skilled in the art. The method can easily be extended to treat additional paleothermometers, such as various biomarker ratios, zircon fission tracks, and $^{40}Ar/^{39}Ar$ for which forward model calculations can be performed. Additional constraints can be employed to allow greater control over the space of temperature histories to be searched. Such additional constraints will eliminate unreasonable temperature histories from the search-space and thereby increase the efficiency of the search for acceptable solutions. As indicated above, the method also allows searches to be carried out for the "pre-depositional" temperature histories of apatite samples. These samples carry fission tracks pre-dating the deposition of the apatite grains in the sedimentary rocks in which they are found.

The method of the present invention may be most usefully applied where: the sediments experienced their maximum temperature in the past, the timing of hydrocarbon generation is a key risk, and conventional measures of source-rock maturity are poor or absent. Particular examples in which the method of the present invention can be usefully employed include:

(1) Determine the timing of hydrocarbon generation at a well site. In such applications, the acceptable temperature histories from the method can be used, along with generation kinetics of source rocks, to calculate allowable hydrocarbon-generation histories. In this application, the uncertainty of generation timing is defined by the range of acceptable temperature histories from the method;

(2) Better determine source-rock maturity and the acceptable range of organic maturity profiles in a basin in which conventional measures of organic maturity are problematic;

(3) Estimate the timing and magnitude of erosion, which can then be used to define source-rock maturity, determine the timing of hydrocarbon yield, complete paleo-structural reconstructions; and (4) Evaluate the effect of meteoric groundwater flow on thermal history. In some basins, the thermal history is so complicated that integrated paleothermometry is the only practical approach. In such instances, the method of the present invention provides analytical opportunities not previously available.

While preferred embodiments of the invention have been shown and described, and some modifications or alternatives have been discussed, it will be understood that the invention is not limited thereto. Modifications to this method can be made and will become apparent to those skilled in the art and are intended to be within the scope of this broad invention.

What is claimed is:

1. A method of estimating temperature histories of a geologic basin, comprising the steps of:

a) obtaining rock sample data;

b) converting said sample data to observed paleothermometric values;

c) generating at least one trial temperature history based upon preselected constraints and estimated paleothermometric values corresponding to said trial temperature history;

d) calculating a measure of fitness between said estimated paleothermometric values and said observed paleothermometric values;

e) recording the temperature history if said measure of fitness satisfies prespecified input criteria;

f) generating at least one updated trial temperature history using a stochastic search algorithm and new estimated paleothermometric values corresponding to said updated trial temperature history; and g) iterating steps d), e), and f) to generate a collection of said updated temperature histories for which said measure of fitness satisfies said prespecified input criteria.

2. The method of claim 1 wherein said step of generating at least one updated trial temperature history further comprises the use of said measure of fitness in said stochastic search algorithm.

3. The method of claim 1 wherein said stochastic search algorithm is a genetic algorithm.

4. The method of claim 3 wherein said genetic algorithm employs a niche-based sharing scheme.

5. The method of claim 1, wherein the trial and updated temperature histories are generated for multiple stratigraphic levels in said basin, said multiple levels jointly used to generate said estimated and observed paleothermometric values.

6. The method of claim 1, wherein the trial and updated temperature histories are generated for multiple depths in said basin, said depths jointly used to generate said estimated and observed paleothermometric values.

7. The method of claim 1, wherein the trial and updated temperature histories are generated for multiple stratigraphic levels and multiple depths in said basin, said multiple levels and said multiple depths jointly used to generate said estimated and observed paleothermometric values.

8. The method of claim 1, wherein said paleothermometric values are obtained using at least two paleothermometers.

9. The method of claim 1, wherein said iterating step is repeated until the collection contains a predetermined number of families or members.

10. The method of claim 1, further comprising the step of retaining a specified number of said temperature histories of said collection having the best measure of fitness based on a predetermined ranking criteria.

11. The method of claim 1, wherein said at least one trial temperature history includes a pre-depositional temperature history.

* * * * *